UNITED STATES PATENT OFFICE.

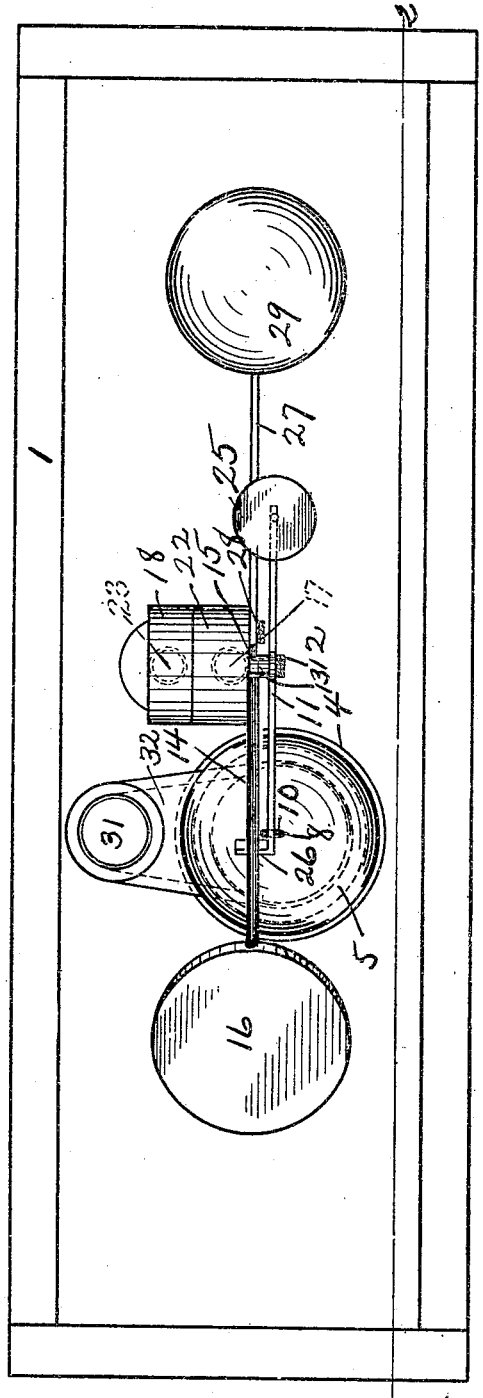

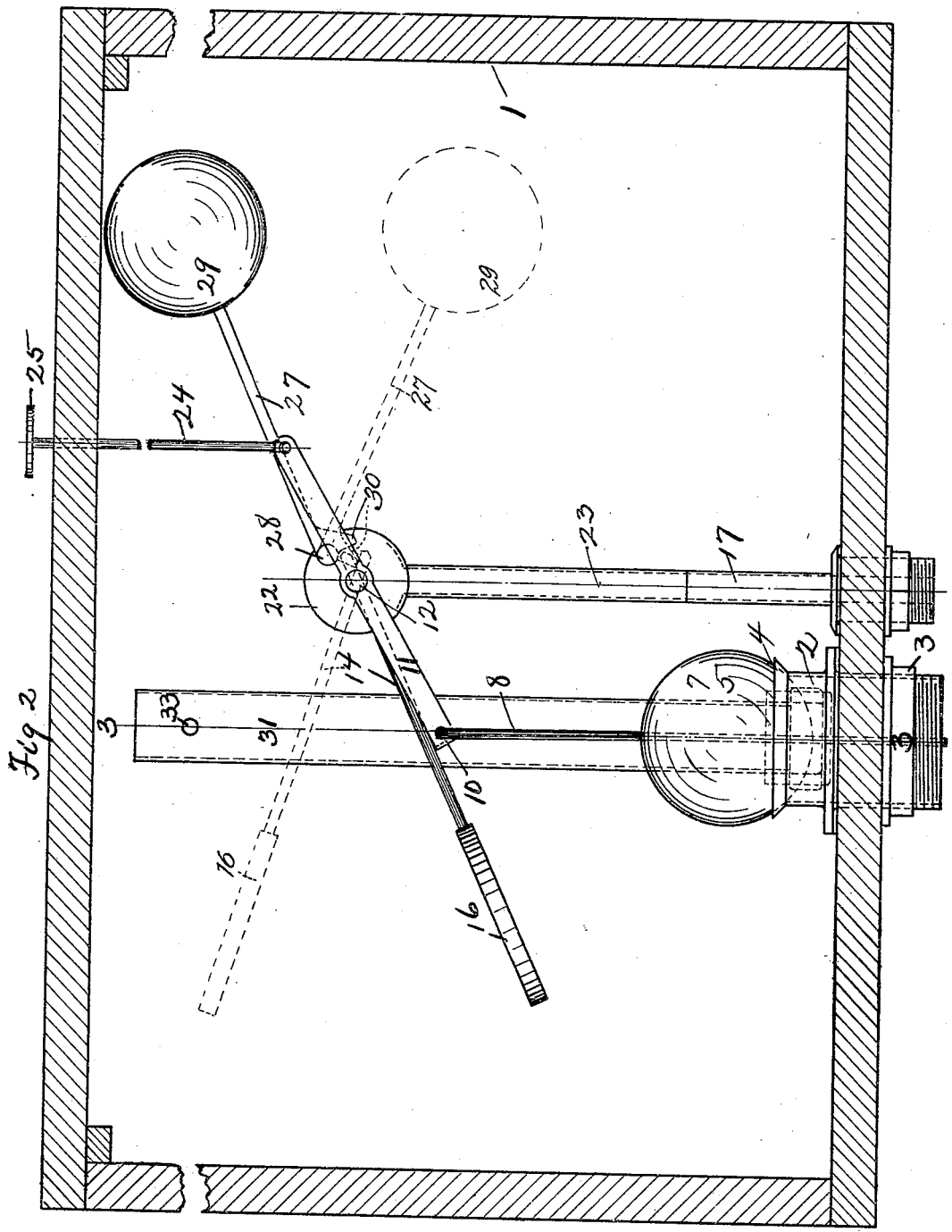

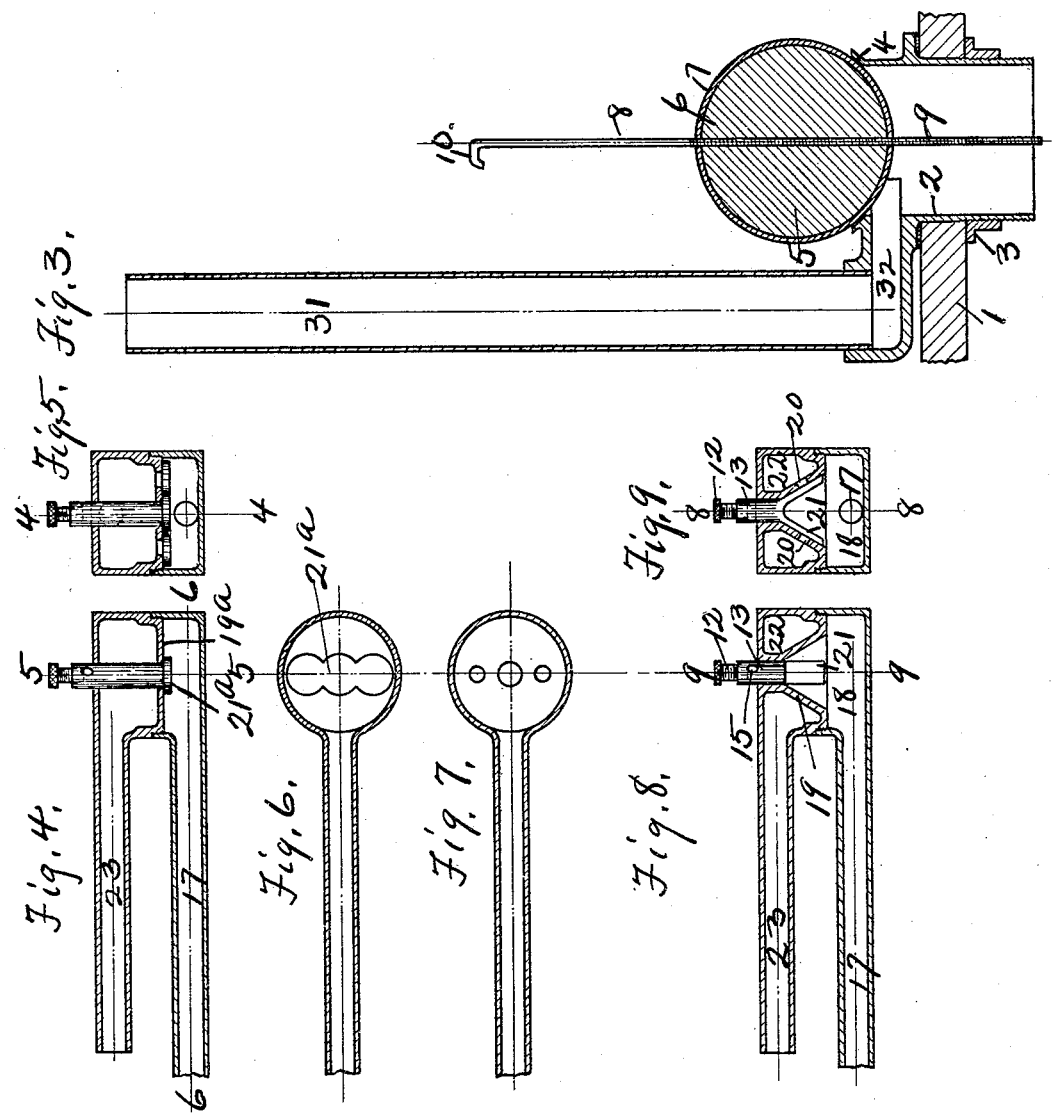

CHARLES H. DUNCAN, OF ERIE, PENNSYLVANIA.

CLOSET-FLUSHING DEVICE.

958,734.  Specification of Letters Patent.  Patented May 24, 1910.

Application filed May 23, 1908. Serial No. 434,479.

*To all whom it may concern:*

Be it known that I, CHARLES H. DUNCAN, a citizen of the United States, residing at Erie, in the county of Erie and State of Pennsylvania, have invented new and useful Improvements in Closet-Flushing Devices, of which the following is a specification.

This invention relates to closet flushing devices, and consists in certain improvements in the construction thereof as will be hereinafter fully described and pointed out in the claims.

The invention is illustrated in the accompanying drawings as follows:

Figure 1 is a plan view of the device with the cover removed from the tank. Fig. 2 is a section on the line 2—2 in Fig. 1. Fig. 3 is a section on the line 3—3 in Fig. 2. Fig. 4 is a section on the line 4—4 in Fig. 5. Fig. 5 is a section on the line 5—5 in Fig. 4. Fig. 6 is a section on the line 6—6 in Fig. 4. Fig. 7 is a section on the line 6—6 in Fig. 4, the valve being removed in Fig. 7. Fig. 8 is a section of a modification of the valve shown in Figs. 4 and 5 on the line 8—8 in Fig. 9. Fig. 9 is a section on the line 9—9 in Fig. 8.

1 marks the tank, which is of the usual form. The discharge fitting 2 is secured in the bottom of the tank by the nut 3. The discharge opening is surrounded by a valve seat 4 on which the float valve 5 is adapted to seat. The float valve 5 is preferably of spherical shape and comprises a ball 6 preferably of wood on which is arranged a rubber coating 7. The rod 8 is screwed through the valve, and has the extension 9 below the valve of sufficient length to form a guide to prevent the ball from moving sidewise sufficiently to interfere with the proper seating of the valve. The upper end of the rod 8 has the hook 10 which is secured to a lever 11. The lever 11 is journaled on a screw 12. The screw 12 is screwed into the end of the valve stem 13. A rod 14 extends through a perforation 15 in the valve stem 13, and is secured therein by means of the set screw 12. The weight 16 is arranged on the end of the rod, and this is of sufficient mass to close the valve.

Water enters through the pipe 17 and passes into a chamber 18. A discharge nozzle 23 is screwed into the chamber 18, and has on it the valve seat 19 with the perforations or valve openings 20. These openings lead to the chamber 22 communicating with the nozzle 23. The valve 21 is cone shaped, and acts in the manner of a gate valve over the openings 20. It will be noted that the water pressure on the valve tends to seat it. It will also be noted that by removing the set screw 12 the lever 11 and rod 14 may be disengaged from the valve stem, and that by unscrewing the discharge nozzle from the chamber 18, the valve with its parts may be readily removed from the tank for the purpose of repair if desired. A push stem 24 extends from the lever 11 at the end of the hook 10, and this stem extends through the top of the tank, and has the push button 25 forming the closet trip. A float rod 27 is pivoted at 28 on the face of the chamber 22. The rod carries the float 29. The rod also has the trigger 30 which is adapted to pass over the end of the rod 14 when the rod 14 is lifted through the depression of the push pin 24 and the elevation of the hook end of the lever 11. The lever 11 has the lateral extension 26 which engages the rod 14 for the purpose of lifting it.

The operation of the device is as follows: When the closet trip is operated, the pin 24 is depressed raising the hook end of the lever 11. This lifts the valve 5, thus opening the discharge from the tank. The inlet valve 21 is also opened by the upward movement of the rod 14. When the rod 14 reaches its upper position, the float 29 has begun to drop, so that the trigger 30 passes over the end of the rod 14 and locks it in its upper position see dotted lines, Fig. 2. This locks the valve 21 in its open position, but does not interfere with the independent movement of the lever 11 to permit the closing of the discharge opening by the valve 5. As the water recedes in the tank the float forming the valve 5 drops with it and closes the discharge opening. The valve 21 being open the tank fills carrying the float 29 upwardly until it reaches a point which trips the rod 14 permitting the weight 16 to drop, thus closing the valve 21. It will be observed, that the valve 21 remains with practically a full opening until the moment of the tripping, when it is immediately cut off through the action of the weight. The weight is preferably formed to present considerable surface to the water to cushion its movement. An over-flow pipe 31 is secured in the elbow 32 extending from the fitting 2. This pipe has an opening 33 slightly below the top of it. This pipe is for a two-fold purpose, first to furnish a safety device to prevent the over-flowing of the device if anything should go wrong with the valve closing mechanism, and secondly to give a supplemental flow after the closing of the discharge valve. With the present construction it is possible to accomplish this with the simple over-flow pipe inasmuch as the rapid inflow of water will more than compensate for the discharge through the opening 33. The point of tripping by the float is fixed with a water level above this, so that after the tripping and closure of the valve 21 there is a continued discharge of the water through the opening 33, the dropping of the float 29 in the present construction in no way disturbing the full closure of the valve 21.

In Figs. 4, 5, 6 and 7 I show an alternative construction of the valve, the only difference being that the valve seat 19$^a$ in the alternative construction is a plain surface rather than conical, and the valve 21$^a$ is arranged to conform to this seat.

What I claim as new is:

1. In a closet flushing device, the combination of a tank; a water inlet; a valve controlling the inlet; a weight for closing the valve; a closet trip for opening said valve and setting said weight; a float; and float actuated tripping mechanism for locking said weight against closing the valve, said mechanism being actuated by the float to release said weight as the float reaches a predetermined level.

2. In a closet flushing device, the combination of a tank having a discharge opening therein; a discharge valve controlling said opening; a water inlet; an inlet valve controlling said inlet; an actuating means for closing the inlet valve; a closet trip for setting said means and opening the discharge valve; a float; and float actuated tripping mechanism for locking said means against closing the water inlet valve, said mechanism being actuated by the float to release said means as the float reaches a predetermined level.

3. In a closet flushing device, the combination of a tank having a discharge opening; a discharge valve controlling said discharge opening; a float carrying said valve; a water inlet; an inlet valve controlling the inlet; an actuating means for closing the inlet valve; a closet trip for opening said inlet valve, setting said means and opening the discharge valve; a float; and float actuated tripping mechanism for locking said means against closing the valve, said mechanism being actuated by the float to release said means as the float reaches a predetermined level.

4. In a closet flushing device, the combination of a tank having a discharge opening; a valve controlling said opening; a water inlet; an inlet valve controlling said water inlet; a lever; a connection between the lever and discharge valve; a connection between the lever and the closet trip; means for closing the inlet valve, said means being in the path of the lever, and arranged to be set by the movement of said lever; a float; float mechanism for locking said means against closing the inlet valve, said mechanism being actuated by the float to release said means, and said lever being free to move independently of said means to permit the closing of the discharge valve; and said closet trip.

5. In a closet flushing device, the combination of a tank having a discharge opening; a float valve controlling the discharge opening; an inlet valve; a swinging lever 11; a rod connecting the float valve with the lever; a connection between the lever and the closet trip; a rotative inlet valve; a rod 14 secured to said inlet valve and arranged in the path of the lever 11; means for exerting closing pressure on the rod 14; a float rod 27 having a trigger 30 for engaging the rod 14 and locking it in its upper position; a float on the rod 27 adapted to move the rod 27 and trigger on said rod to release the rod 14 and permit the closing of the inlet valve; and said closet trip.

6. In a closet flushing device, the combination of a tank; a water inlet; a rotative valve controlling the inlet; an actuating means for closing said valve; a float; and tripping mechanism for locking said means against closing the valve, said mechanism being actuated by the float to release said means as the float reaches a predetermined level.

7. In a closet flushing device, the combination of a tank; a water inlet; a rotative valve controlling the inlet; an actuating means for closing the valve; a float; and trip mechanism for locking said means against closing the valve, said mechanism being actuated by the float to release said means as the float reaches a predetermined level.

8. In a closet flushing device, the combination of a tank; a water inlet; a rotative valve controlling said inlet, the water operating on said valve to force it toward its seat; a float; and devices controlled by the float for closing said valve at a predetermined level of liquid in the tank.

9. In a closet flushing device, the combination of a tank; a water inlet; a rotative valve controlling said inlet, the water operating on said valve to force it toward its seat; a float; and devices controlled by the float for closing said valve at a predetermined level of liquid in the tank.

10. In a closet flushing device, the combination of a tank; an inlet comprising the chamber 18; a discharge nozzle removably secured to the chamber 18; and a rotative inlet controlling valve carried by the nozzle and removable therewith, said valve being forced toward its seat by the inlet pressure.

11. In a closet flushing device, the combination of a tank; an inlet having a chamber 18; a rotative valve controlling the inlet and being subjected to the inlet pressure for forcing it to its seat, said valve having a stem 13; and a weight secured to said stem; a float actuated trip for locking the weight in an upper position, said rotative inlet controlling valve being carried by the nozzle and removable therewith.

12. In a closet flushing device, the combination of a tank; an inlet having a chamber 18; a rotative valve controlling the inlet and being subjected to the inlet pressure for forcing it to its seat, said valve having a stem 13; a weight secured to said stem; and a float actuated trip for locking the weight in position to maintain the valve in open position, and to release the weight with the float at a predetermined level.

13. In a closet flushing device, the combination of a tank; a rotative inlet valve; a weight secured to the stem of said valve and adapted to close the same; a set screw for securing the weight to the valve stem; a lever journaled on the set screw; a discharge valve and closet trip mechanism connected with the lever, said lever being adapted to actuate the weight in an upper position and adapted to release the weight under the influence of the float; and said float.

In testimony whereof I have hereunto set my hand in the presence of two subscribing witnesses.

CHARLES H. DUNCAN.

Witnesses:
C. H. FOOTE,
CHAS. H. LE JEAL.